Feb. 27, 1951     G. A. GOEPFRICH     2,543,455

VALVE

Filed Jan. 3, 1946

INVENTOR.
George A Goepfrich
BY
Kenyon & Kenyon
ATTORNEYS

UNITED STATES PATENT OFFICE 2,543,455

VALVE

George A. Goepfrich, Stamford, Conn., assignor, by mesne assignments, to The Skinner Chuck Company, a corporation of Connecticut Application January 3, 1946, Serial No. 638,719

6 Claims. (Cl. 138—46)

This invention relates to valves.

Many airplanes are at present equipped with landing gear retracting means which are hydraulically operated. It is desirable that the landing gear be retracted as fast as possible, but that its rate of retraction be materially reduced as it approaches its position of rest in order to prevent undesirable shock upon the landing gear reaching its position of rest. To accomplish this reduction in retraction rate, the rate of flow of hydraulic fluid to the retracting means is decreased.

An object of this invention is an inexpensive and efficient solenoid-actuated valve suitable for use in hydraulically-operated landing gear retracting means to effect reduction in the flow of hydraulic fluid as the landing gear approaches its limit of retraction.

Other objects, novel features and advantages of this invention will become apparent from the following specification and accompanying drawings, wherein.

Figure 2:
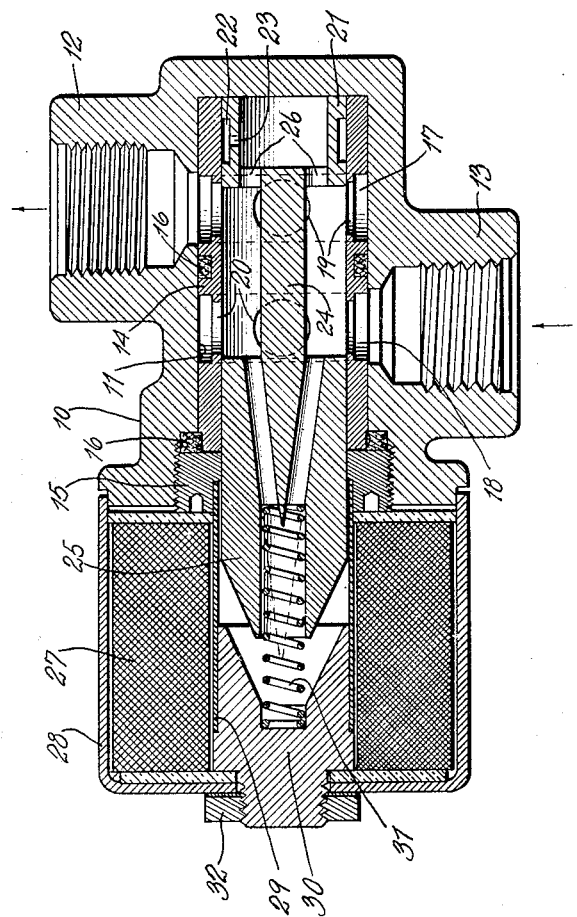
Fig. 2 is a section on the line 2—2 of Fig. 1.
Figure 1:
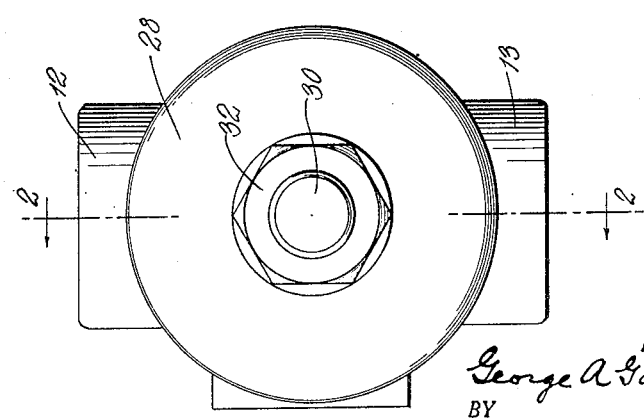
Fig. 1 is a plan view of a valve embodying the invention.

A casting 10 has a cylindrical bore 11 and two tapped sockets 12 and 13, the inner ends of which communicate with the bore 11. A cylindrical liner or housing 14 fits the bore 11 and is held in place by a bushing 15 threaded into the casting 10 and engaging the end of the liner. Suitable sealing members 16 are provided for preventing liquid flow between the liner and the interior of the casting 10. The liner 14 is provided with peripheral grooves 17 and 18 of which 17 communicates with the socket 12 and 18 communicates with the socket 13. Radial apertures 19 and 20 in the liner 14 provide communication between the grooves 17 and 18 and the interior of the liner.

A skirted valve plunger 21 is slidably mounted in the liner 14 and the skirt is provided with a peripheral groove 22 which communicates with the interior of the skirt through a restricted aperture 23. The plunger 21 has extending therefrom a stem 24 which for a distance is of less diameter than the interior of the liner and terminates in a magnetic head 25 of the same external diameter as the interior diameter of the liner. Apertures 26 provide passageways for liquid flow into or out of the sleeve 21.

The head 25 constitutes the armature of a solenoid having an energizing coil 27 contained within a cap 28 fitting over a boss on the casting 10. The bushing 15 supports a non-magnetic sleeve 29 receiving the head 25 and to the outer end of which is brazed or soldered a magnetic core 30 between which and the head 25 is arranged an expansion spring 31. The cap 28 is supported by the core 30 and is attached thereto by means of the nut 32.

With the solenoid de-energized, the valve sleeve 21 is biased into the position shown in Fig. 2 by the spring 31. In this position, the socket 12 is in full communication with the socket 13 and liquid may flow freely in either direction. Upon energization of the solenoid, the armature 25 is moved against the action of the spring 31 into a position in which the sleeve valve 21 spans the apertures 19. The liquid flow between the ports 12 and 13 is now cut off except by way of the aperture 23 so that only a very restricted amount of liquid may flow from one port to the other. This condition remains as long as the solenoid is energized, but upon de-energization of the solenoid, the sleeve valve is returned to the position shown in Fig. 2 by the spring 31.

It is of course understood that various modifications may be made in the valve structure above described without in any way departing from the spirit of the invention as defined in the appended claims.

It is further to be understood that the valve herein described is adapted for other uses than the example hereinabove referred to.

I claim:

1. An hydraulic valve mechanism comprising a cylindrical housing having longitudinally spaced radially directed inlet and outlet ports in the walls thereof, a hollow cylindrical liner within said housing having a peripheral groove communicating with one of said ports, and radial apertures communicating with said peripheral groove and the interior of said liner, said ports, groove and apertures being adapted to permit a predetermined maximum rate of flow of fluid through said housing, means for controllably but partially reducing said maximum rate of flow comprising a hollow cylindrical sleeve fitting the inner wall of said liner and slidably mounted for movement over said apertures by longitudinal movement in said liner, said sleeve having a peripheral groove in its outer wall and a radially directed port communicating with the latter groove and the interior of said sleeve but substantially smaller in dimension than said apertures, said groove in said sleeve being adapted to overlie said apertures when said sleeve is in a longitudinal position covering said apertures, said apertures being uncovered by said sleeve in another longitudinal position of said sleeve.

2. A mechanism as in claim 1, including spring-biasing means biasing said sleeve to the second-mentioned position.

3. A mechanism as in claim 2, including electromagnet means for moving said sleeve to said first position against the biasing force of said spring to reduce said maximum rate of flow.

4. An hydraulic valve mechanism comprising a hollow, cylindrical housing having longitudinally spaced radially directed inlet and outlet ports in the walls thereof, a hollow cylindrical liner fitting the inner wall of said housing and having peripheral grooves each communicating with one of said ports and radial apertures communicating with said peripheral grooves and the interior of said liner, said ports, grooves, and apertures being adapted to permit a predetermined maximum rate of flow of fluid through said housing, means for controllably but partially reducing said maximum rate of flow comprising a hollow cylindrical sleeve fitting the inner wall of said liner and slidably mounted for movement over the said apertures communicating with one of said grooves by longitudinal movement in said liner, said sleeve having a peripheral groove in its outer wall and a radially directed port communicating with the latter groove and the interior of said sleeve but substantially smaller in dimension than said apertures, said groove in said sleeve being adapted to overlie said apertures communicating with said one of said grooves when said sleeve is in a longitudinal position covering the latter apertures, the latter apertures being uncovered by said sleeve in another longitudinal position of said sleeve.

5. A mechanism as in claim 4, including spring-biasing means biasing said sleeve to the second-mentioned position.

6. A mechanism as in claim 5 including electromagnetic means for moving said sleeve to said first position against the biasing force of said spring to reduce said maximum rate of flow.

GEORGE A. GOEPFRICH.

REFERENCES CITED

The following references are of record in the file of this patent:

UNITED STATES PATENTS

| Number | Name | Date |
|---|---|---|
| 1,145,128 | Ekonomcu | July 6, 1915 |
| 1,453,513 | Metz | May 1, 1923 |
| 1,820,653 | Ernst | Aug. 25, 1931 |
| 1,903,757 | Florido | Apr. 18, 1933 |
| 2,217,141 | Sprenkle | Oct. 8, 1940 |